United States Patent Office 2,828,292
Patented Mar. 25, 1958

2,828,292
POLYMERS OF 3-ALKYLIDENE PHTHALIMIDINES

Harry W. Coover, Jr., Kingsport, Tenn., assignor to Eastman Kodak Company, Rochester, N. Y., a corporation of New Jersey No Drawing. Application July 28, 1953
Serial No. 370,868

10 Claims. (Cl. 260—80.3)

This invention relates to resinous polymers of 3-alkylidene phthalimidines and to a process for their preparation.

C. E. Dent, in Journal of the Chemical Society, pages 1–6 (1938), describes the preparation of 3-methylene phthalimidine and indicates that it readily polymerizes to a resinous substance. He points out that 3-methylene phthalimidine melts when immersed in a bath at 120–125° C. If slowly heated, it sinters at 230° C. and melts at 250–260° C. owing to polymerization. He further points out that when heated to a higher temperature, it rapidly polymerizes to a resinous substance, hard and brittle when cold and usually red. On adding it to boiling water, Dent also points out, it dissolves and then in a few seconds polymerizes forming a white milky colloid solution which barely shows signs of settling in a week. The polymers described in the above article have been found to be of unusually low molecular weight and are not useful as molding or fiber-forming materials due to their low molecular weight and extreme brittleness.

I have now found that homopolymers and copolymers of high molecular weight can be obtained from certain 3-alkylidene phthalimidines. The polymers obtained according to my invention are characterized by their high melting points, toughness and dyeability, and I have found further that these polymers can readily be dissolved in solvents such as dimethyl formamide, dimethyl acetamide, alkyl sulfone amides, alkyl phosphone amides, etc., to give solutions which are useful in the preparation of films, fibers, sheets, etc. These polymers are also valuable as molding materials. The copolymers of my invention are especially suitable for molding and fiber-forming purposes, because of the ability to control the softening points by variation in the proportions of the components. For example, a copolymer of styrene and 3-methylene phthalimidine exhibits a softening point range of from 100–300° C. as the amount of 3-methylene phthalimidine ranges from about 5 to 95% by weight of the copolymer.

It is, accordingly, an object of my invention to provide polymers of 3-alkylidene phthalimidines of high molecular weight. Another is to provide copolymers of 3-alkylidene phthalimidines which are especially suitable for molding and fiber-forming purposes. Another object is to provide a process for preparing such polymers. Other objects will become apparent from a consideration of the following description and examples.

According to my invention, I prepare high molecular polymers by subjecting a compound having the general formula:

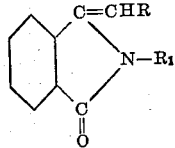

wherein R represents an atom of hydrogen or a methyl group and $R_1$ represents an atom of hydrogen or an alkyl group containing from 1 to 4 carbon atoms (e. g. methyl, ethyl, propyl, isopropyl, butyl, isobutyl, etc. groups) to polymerizing conditions alone or with a different ethylenically unsaturated, polymerizable compound containing a $-CH=C<$ group, but more especially a compound containing a single $CH_2=CH-$ group. Typical 3-alkylidene phthalimidine compounds coming within the above definition include 3-methylene phthalimidine, 3-ethylidene phthalimidine, N-methyl-3-methylene phthalimidine, N-methyl-3-ethylidene phthalimidine, N-ethyl-3-methylene phthalimidine, N-propyl-3-methylene phthalimidine, N-butyl-3-methylene phthalimidine, etc. The N-alkyl substituted 3-alkylidene phthalimidines can be prepared, for example, by treating 3-alkylidene phthalides with N-alkylacetamides in accordance with the general method described by S. Sugasawa et al., J. Pharm. Soc. Japan, 63, pages 98–101 (1943); C. A. 44, page 7310 (1950).

The homo- and co-polymerizations according to my invention can be carried out in mass, but preferably in solution in a solvent or in the form of a suspension or emulsion in aqueous or other suitable nonsolvent or diluent. The polymerizations can be carried out batch-wise or in a continuous mode of operation, reaction mixture being added and polymerized product being bled off as formed. Heat and actinic light accelerate the polymerizations, but advantageously a polymerization catalyst is employed, e. g. organic or inorganic peroxides such as hydrogen peroxide, benzoyl peroxide, acetyl peroxide, lauroyl peroxide, tertiary butyl hydroperoxide, persulfates such as sodium persulfate, potassium persulfate, ammonium persulfate, persulfuric acid, etc., perborates, such as sodium perborate, potassium perborate, etc., the water-soluble salts of perphosphoric acid, the water-soluble salts of sulfo-acids, etc. Boron trifluoride is also an effective polymerization catalyst. Mixtures of catalysts can be employed. The amount of catalyst can advantageously be from 0.01 to 1% by weight or even more, based on the weight of the monomer to be polymerized. Advantageously, the polymerizations are carried out at a temperature of from 0° to 100° C. but preferably from 30° to 80° C.

For emulsion polymerizations any non-solvent for the monomer can be employed, water being especially advantageous. The monomer or mixtures of monomers can be advantageously emulsified in water using an emulsifying agent such as a salt of a higher fatty acid, e. g. sodium or potassium laurate, stearate, palmitate, etc., an ordinary soap, a salt of a higher fatty alcohol sulfate, e. g. sodium or potassium lauryl sulfate, sodium or potassium di(3-ethylhexyl) sulphosuccinate, sodium or potassium cetyl sulfate, sodium or potassium stearyl sulfate, etc., a salt of an aromatic sulfonic acid, e. g. sodium or potassium salt of an alkylnaphthalene sulfonic acid, etc., a higher molecular weight quaternary ammonium salt containing the radical $C_{15}H_{31}$ or the radical $C_{17}H_{35}$, etc. The amount of emulsifying agent employed can vary from about 1 to 5%, based on the total weight of the reaction mixture. Mixtures of emulsifying agents can be employed. For bead or granular polymerizations, relatively poor dispersing agents such as starch, methylated starch, gum arabic, polyvinyl alcohol, partially hydrolyzed polyvinyl acetate, gelatin, sodium glycolate, etc. can be employed. Mixtures of these dispersing agents can also be used. The dispersions and polymerizations can be facilitated by stirring, shaking or tumbling the reaction mixture. Advantageously, an activating agent such as sodium bisulfite, potassium bisulfite, sodium hydrosulfite, sulfinic acid, etc., can be used in conjunction with the peroxide catalyst and in about the same amount. If desired, a chain regulator such as a mercaptan, e. g. hexyl, cetyl, lauryl, mercaptans, etc. can also be added with advantage to the aqueous polymerization mixtures.

Suitable other polymerizable compounds for preparing the copolymers of my invention include styrene, α-methylstyrene, p-acetaminostyrene, α-acetoxystyrene, isopropenyl acetate, isopropenyl methyl ketone, vinyl esters of carboxylic acids (e. g. vinyl acetate, vinyl propionate, vinyl butyrate, vinyl stearate, vinyl trifluoroacetate, vinyl benzoate, etc.), vinyl alkyl ethers (e. g. methyl vinyl ether, butyl vinyl ether, etc.), vinyl sulfoamides (e. g. vinyl sulfoamide, N-methyl vinyl sulfoamide, etc.), vinyl halides (e. g. vinyl chloride, vinyl bromide, vinyl fluoride), vinylidene halides (e. g. vinylidene dichloride, vinylidene difluoride, vinylidene chloride-bromide, etc.), vinyl urethanes (e. g. vinyl methyl urethane, vinyl ethyl urethane, etc.), cyclic vinyl imides (e. g. vinyl succinimide, vinyl phthalimide, etc.), acrylic acid and its derivatives (e. g. acrylamide, N-alkyl acrylamides, acrylonitrile, alkyl esters such as methyl, ethyl, propyl, butyl, benzyl, phenyl acrylates, etc.) and methacrylic acid and its corresponding amides, nitrile, esters, etc., alkyl maleates and fumarates (e. g. dimethyl maleate, diethyl fumarate, etc.), fumaronitrile, ethylene, isobutylene, butadiene, and the like. Mixtures of one or more of the 3-alkylidene phthalimidines mentioned can be copolymerized with any of the above different polymerized compounds containing at least one $CH_2=C$ group. The proportions of components making up the copolymer can vary in any ratio, but preferably from 5 to 95% by weight of the 3-alkylidene phthalimidine and from 95 to 5% by weight of the other different polymerizable compound. The composition of the copolymers is approximately the same as the comonomers in the starting polymerization mixtures.

The following examples will serve to illustrate further the polymers of my invention and the manner of preparing the same.

*Example 1*

10 g. of 3-methylene phthalimidine, 0.01 g. of acetyl peroxide and 100 cc. of acetonitrile were heated at 40° C. for a period of 28 hours. The resulting white polymer precipitated from acetonitrile and was soluble in a 50:50 mixture of acetonitrile and dimethylformamide. The softening point of the polymer was above 300° C.

In place of the acetyl peroxide in the above example, there can be substituted a like amount of benzoyl peroxide or lauryl peroxide, to give a similar kind of homopolymer. Other peroxides such as di-tert. butyl peroxide and tert. butyl peroxide can also be substituted, but they require a somewhat higher temperature; i. e. from 60°–80° C., for satisfactory polymerization in the above system.

*Example 2*

10 g. of N-methyl-3-methylene phthalimidine plus 0.01 g. of benzoyl peroxide was heated at 65°–70° C. for 12 hours. The polymer obtained had a softening point above 250° C. and was soluble in dimethylformamide.

*Example 3*

10 g. of 3-ethylidene phthalimidine was emulsified in 25 cc. of distilled water containing 1 g. of soap flakes. To this was added 0.06 g. of ammonium persulfate and 0.1 g. of sodium bisulfite. Polymerization was carried out at 40° C. The polymer which formed was precipitated by the addition of acetic acid. The polyethylidene phthalimidine obtained had a softening point above 200° C. and softens in dimethylformamide.

*Example 4*

5 g. of 3-methylene phthalimidine, 5 g. of acrylonitrile and 0.01 g. of acetyl peroxide were heated at 60° C. for 12 hours. The white, powdery copolymer obtained had a softening point of 180° C. and was soluble in dimethylformamide. Other monomer compositions of 3-methylene phthalimidine and acrylonitrile give similar kinds of copolymers with different softening points.

*Example 5*

8 g. of N-methyl-3-methylene phthalimidine, 2 g. of acrylonitrile, 100 cc. of acetic acid and 0.1 g. of acetyl peroxide were heated at 60° C. for 24 hours. The white copolymer obtained was soluble in dimethylacetamide and had a softening point of 295° C. Analysis indicated that it contained approximately 80% by weight of N-methyl-3-methylene phthalimidine and 20% by weight of acrylonitrile. Valuable fibers can be spun by extruding a solution of the copolymer in dimethylacetamide through an orifice into a precipitating bath and drafting the fiber obtained.

*Example 6*

5 g. of N-methyl-3-methylene phthalimidine, 5 g. of vinylidene chloride, 0.01 g. of acetyl chloride and 100 cc. of acetonitrile were heated together at 50° C. for 24 hours. The resulting white copolymer precipitated from acetonitrile. It was readily soluble in dimethylformamide, had a softening point above 150° C., and contained approximately equal parts by weight of N-methyl-3-methylene phthalimidine and vinylidene chloride.

*Example 7*

0.5 g. of 3-methylene phthalimidine, 9.5 g. of vinyl chloride, 0.06 g. of ammonium persulfate and 0.01 g. of sodium bisulfite in 25 cc. of distilled water containing 1 g. of potassium laurate were emulsified in a pressure bottle. Polymerization was carried out at 35° C. for 8 hours. The copolymer was precipitated by the addition of acetic acid. It contained approximately 5% by weight of 3-methylene phthalimidine and 95% by weight of vinyl chloride, had a softening point above 90° C. and was readily soluble in dimethylformamide.

*Example 8*

9.5 g. of 3-ethylidene phthalimidine, 0.5 g. of methyl methacrylate and 0.1 g. of azo-bis-isobutyronitrile were dissolved in 100 cc. of acetonitrile and heated at 60° C. for 24 hours. The resulting white copolymer precipitated from the acetonitrile, but was readily soluble in dimethylformamide. It contained approximately 95% by weight of 3-ethylidene phthalimidine and 5% by weight of methyl methacrylate and had a softening point above 150° C.

*Example 9*

3 g. of N-methyl-3-methylene phthalimidine and 7 g. of butadiene were emulsified in 100 cc. of water containing 2 g. of potassium laurate in a pressure bottle. After the emulsification was completed, 0.1 g. of ammonium persulfate and 0.1 g. of sodium bisulfite were added and the polymerization completed by heating at 40° C. for 24 hours. The resultant emulsion was precipitated by the addition of acetic acid to give a white, rubbery polymer which was not swollen by aromatic solvents such as benzene or toluene.

By proceeding as set forth in the above examples, other generally similar copolymers can be prepared by employing starting polymerization mixtures containing 10%, 15%, 20%, 40%, 60%, etc. by weight of one or more of the mentioned 3-alkylidene phthalimidines, the remainder of the monomers being one or more of the other mentioned polymerizable compounds containing at least one ethylenic unsaturation. All of the copolymers of the invention can be dissolved in one or more volatile solvents in addition to those already mentioned such as α-butyrolactone, N-methyl-2-pyrrolidone, ethylene carbonate, malononitrile, ethylene cyanohydrin, dimethyl sulfone, dimethyl cyanamide N,N-dimethyl methoxyacetamide, dimethyl sulfoxide, N-formyl pyrrolidone, tetramethylene sulfoxide, N-formyl morpholine, N,N'-tetramethylene methanephosphondiamide, and the like. The solutions or dopes of certain of the copolymers of the invention can be extruded to form filaments as with the acrylonitrile containing copolymers, coated to continuous sheets, photographic film supports, etc. Many of the copolymers of the invention are also especially useful as moulding materials to give heat resistant shaped articles. All the compositions whether designed for use in the form of their solutions or dopes or in the form of solid molding compositions can, if desired, have incorporated therein suitable plasticizers, fillers, coloring matter, and the like.

What I claim is:

1. A resinous copolymer of from 5 to 95 percent by weight of a compound selected from those represented by the following general formula:

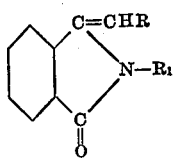

wherein R represents a member selected from the group consisting of a hydrogen atom and a methyl group and $R_1$ represents a member selected from the group consisting of a hydrogen atom and an alkyl group containing from 1 to 4 carbon atoms, and from 95 to 5 percent by weight of a monoethylenically unsaturated, polymerizable compound selected from the group consisting of a vinyl carboxylate wherein the carboxylate group is the radical of a saturated fatty acid of 1 to 4 carbon atoms, vinyl chloride, vinylidene chloride, acrylic acid, methacrylic acid, acrylonitrile, methacrylonitrile, acrylamide, methacrylamide, an N-alkyl acrylamide, an N-alkyl methacrylamide, an N,N-dialkyl acrylamide, an N,N-dialkyl methacrylamide, an alkyl acrylate, an alkyl methacrylate, a styrene, a vinyl alkyl urethane, vinyl succinimide and vinyl phthalimide, and wherein the said alkyl group in each instance contains from 1 to 4 carbon atoms.

2. A resinous copolymer of from 5 to 95 percent by weight of 3-methylene phthalimidine and from 95 to 5 percent by weight of acrylonitrile.

3. A resinous copolymer of from 5 to 95 percent by weight of N-methyl-3-methylene phthalimidine and from 95 to 5 percent by weight of acrylonitrile.

4. A resinous copolymer of from 5 to 95 percent by weight of N-methyl-3-methylene phthalimidine and from 95 to 5 percent by weight of vinylidene chloride.

5. A resinous copolymer of from 5 to 95 percent by weight of 3-ethylidene phthalimidine and from 95 to 5 percent by weight of methyl methacrylate.

6. A process for preparing a resinous copolymer containing a 3-alkylidene phthalimidine comprising heating in the presence of a peroxide polymerization catalyst a mixture containing from 5 to 95 percent by weight of a compound selected from those represented by the following general formula:

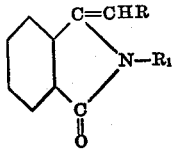

wherein R represents a member selected from the group consisting of a hydrogen atom and a methyl group and $R_1$ represents a member selected from the group consisting of a hydrogen atom and an alkyl group containing from 1 to 4 carbon atoms, and from 95 to 5 percent by weight of a monoethylenically unsaturated, polymerizable compound selected from the group consisting of a vinyl carboxylate wherein the carboxylate group is the radical of a saturated fatty acid of 1 to 4 carbon atoms, vinyl chloride, vinylidene chloride, acrylic acid, methacrylic acid, acrylonitrile, methacrylonitrile, acrylamide, methacrylamide, an N-alkyl acrylamide, an N-alkyl methacrylamide, an N,N-dialkyl acrylamide, an N,N-dialkyl methacrylamide, an alkyl acrylate, an alkyl methacrylate, a styrene, a vinyl alkyl urethane, vinyl succinimide and vinyl phthalimide, and wherein the said alkyl group in each instance contains from 1 to 4 carbon atoms.

7. A process for preparing a resinous copolymer of 3-methylene phthalimidine and acrylonitrile comprising heating in the presence of an organic peroxide polymerization catalyst a mixture containing from 5 to 95 percent by weight of 3-methylene phthalimidine and from 95 to 5 percent by weight of acrylonitrile.

8. A process for preparing a resinous copolymer of N-methyl-3-methylene phthalimidine and acrylonitrile comprising heating in the presence of an organic peroxide polymerization catalyst a mixture containing from 5 to 95 percent by weight of N-methyl-3-methylene phthalimidine and from 95 to 5 percent by weight of acrylonitrile.

9. A process for preparing a resinous copolymer of N-methyl-3-methylene phthalimidine and vinylidene chloride comprising heating in the presence of an organic polymerization catalyst a mixture containing from 5 to 95 percent by weight of N-methyl-3-methylene phthalimidine and from 95 to 5 percent by weight of vinylidene chloride.

10. A process for preparing a resinous copolymer of 3-ethylidene phthalimidine and methyl methacrylate comprising heating in the presence of an organic peroxide polymerization catalyst a mixture containing from 5 to 95 percent by weight of 3-ethylidene phthalimidine and from 95 to 5 percent by weight of methyl methacrylate.

References Cited in the file of this patent

UNITED STATES PATENTS

| | | |
|---|---|---|
| 2,558,139 | Knock et al. | June 26, 1951 |
| 2,618,627 | Coover et al. | Nov. 18, 1952 |

OTHER REFERENCES

Dent: Journal Chem. Soc., 1938, pages 1–6.